(12) United States Patent
Letas et al.

(10) Patent No.: US 9,787,174 B2
(45) Date of Patent: Oct. 10, 2017

(54) CHOPPER-BOOSTED CONVERTER FOR WIND TURBINES

(71) Applicant: SENVION SE, Hamburg (DE)

(72) Inventors: Heinz-Hermann Letas, Bovenau (DE); Malte Mohr, Felde (DE)

(73) Assignee: SENVION SE, Hamburg (DE)

( * ) Notice: Subject to any disclaimer, the term of this patent is extended or adjusted under 35 U.S.C. 154(b) by 245 days.

(21) Appl. No.: 14/389,253

(22) PCT Filed: Mar. 27, 2013

(86) PCT No.: PCT/EP2013/056587
§ 371 (c)(1),
(2) Date: Sep. 29, 2014

(87) PCT Pub. No.: WO2013/144242
PCT Pub. Date: Oct. 3, 2013

(65) Prior Publication Data
US 2015/0048683 A1    Feb. 19, 2015

(30) Foreign Application Priority Data

Mar. 29, 2012 (DE) .................. 10 2012 006 259

(51) Int. Cl.
*H02J 1/10* (2006.01)
*H02J 3/38* (2006.01)
(Continued)

(52) U.S. Cl.
CPC ........... *H02M 1/4208* (2013.01); *H02J 3/386* (2013.01); *H02M 1/32* (2013.01); *H02M 5/04* (2013.01);
(Continued)

(58) Field of Classification Search
CPC .... H02J 3/383; H02J 1/00; H02J 3/386; H02J 3/381; H02J 3/385; H02J 3/32; H02J 4/00;
(Continued)

(56) References Cited

U.S. PATENT DOCUMENTS 8,350,518 B2 *  1/2013  Ueda ...................... H02M 5/297
                                                                    318/800
8,436,490 B2 *  5/2013  Gertmar ................ H02J 3/1842
                                                                    307/100
(Continued)

FOREIGN PATENT DOCUMENTS

DE    10 2010 039 332    3/2011

OTHER PUBLICATIONS

International Preliminary Report on Patentability dated Oct. 1, 2014, directed to International Application No. PCT/EP2013/056587; 9 pages.

(Continued)

*Primary Examiner* — Jared Fureman
*Assistant Examiner* — Esayas Yeshaw
(74) *Attorney, Agent, or Firm* — Morrison & Foerster LLP

(57) ABSTRACT

A converter including a converter control for a wind turbine and a chopper, wherein the converter control includes a dynamic limit value which is allowable for a first tolerance time and a static limit value of the converter. Furthermore, an overcurrent module is provided which includes a limit value expander which is designed to increase the static limit value by a portion of the difference from the dynamic limit value as additional current, and a dynamic module which interacts with the limit value expander in such a way that overcurrents between the static limit value which is increased by the additional current and the dynamic limit (Continued)

value are routed in a first stage to the converter and in a second stage at least partially to the chopper, wherein a switch is made to the second stage after a second tolerance time.

21 Claims, 2 Drawing Sheets

(51) Int. Cl.
| | |
|---|---|
| *H02M 1/42* | (2007.01) |
| *H02M 1/32* | (2007.01) |
| *H02P 29/024* | (2016.01) |
| *H02M 5/04* | (2006.01) |
| *H02P 29/032* | (2016.01) |
| *H02P 9/00* | (2006.01) |
| *H02P 101/15* | (2016.01) |

(52) U.S. Cl.
CPC .......... *H02P 29/027* (2013.01); *H02P 29/032* (2016.02); *H02M 2001/327* (2013.01); *H02P 9/007* (2013.01); *H02P 2101/15* (2015.01); *Y02E 10/763* (2013.01); *Y10T 307/549* (2015.04)

(58) Field of Classification Search
CPC ........ H02J 7/35; H02J 1/10; H02J 3/00; H02J 7/0063; H02J 7/0065
USPC .......................................................... 307/52
See application file for complete search history.

(56) References Cited

U.S. PATENT DOCUMENTS

| | | | | |
|---|---|---|---|---|
| 8,664,788 | B1* | 3/2014 | Wagoner | ............... F03D 7/0244 290/44 |
| 2008/0252076 | A1* | 10/2008 | Fortmann | ............... H02J 3/386 290/44 |
| 2010/0133831 | A1* | 6/2010 | Scholte-Wassink | .. F03D 7/0292 290/44 |
| 2011/0035068 | A1* | 2/2011 | Jensen | .................... F03D 7/047 700/287 |
| 2011/0140430 | A1 | 6/2011 | Ritter et al. | |
| 2011/0193345 | A1 | 8/2011 | Arinaga et al. | |
| 2012/0139246 | A1 | 6/2012 | Rafoth | |
| 2012/0217748 | A1* | 8/2012 | Gjerlov | ................. F03D 7/0204 290/44 |
| 2013/0026759 | A1* | 1/2013 | Krueger | ............... F03D 7/0272 290/44 |
| 2015/0333677 | A1* | 11/2015 | Letas | ..................... F03D 9/003 290/44 |

OTHER PUBLICATIONS

Xu, D. et al. (2009). "Reactive Power Analysis and Control of Doubly Fed Induction Generator Wind Farm," *13th European Conference on Power Electronics and Applications, EPE '09*; 10 pages.
International Search Report mailed Mar. 24, 2014, directed to International Application No. PCT/EP2013/056587; 15 pages.

* cited by examiner

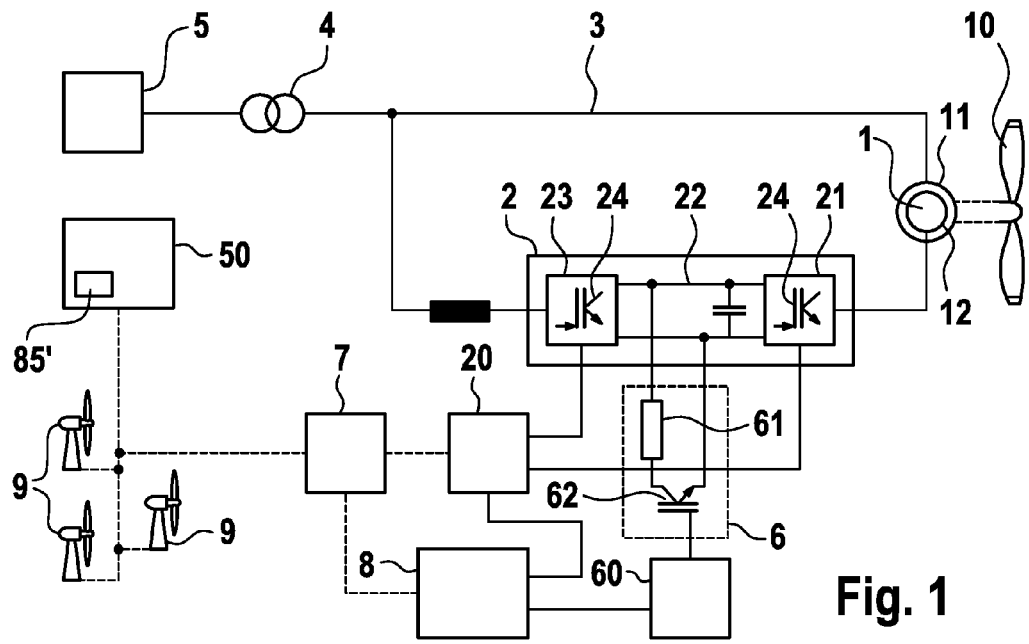
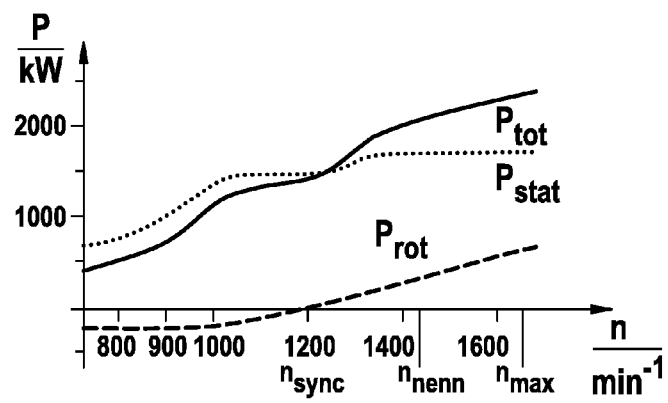
Fig. 2 a)
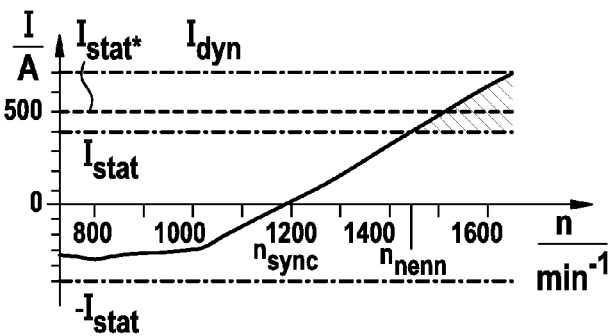
b)

CHOPPER-BOOSTED CONVERTER FOR WIND TURBINES

REFERENCE TO RELATED APPLICATIONS

This application is a national stage application under 35 USC 371 of International Application No. PCT/EP2013/056587, filed Mar. 27, 2013, which claims priority to German Application No. 10 2012 006 259.1, filed Mar. 29, 2012, the entire contents of which are incorporated herein by reference.

FIELD OF THE INVENTION

The present invention relates to a converter including a converter control for wind turbines which have a wind rotor including a generator which is driven by it, and a chopper, wherein the converter control includes a configuration data record for dynamic and static limit values of the converter.

BACKGROUND OF THE INVENTION

Converters of the kind initially specified are in particular used in wind turbines which are used not only for generating real power, but which also provide reactive power. To increase network quality, wind turbines are also increasingly being expected by the network operator to provide considerable reactive power on demand. Providing reactive power has become a network service which is a prerequisite in many places for connecting a wind turbine to an energy transmission network and operating it efficiently. It is to be understood that by providing reactive power, normal operation of the wind turbine is preferably not to be affected, and that the wind turbine in particular must furthermore be reliable, in particular gust-resistant.

It is generally possible to provide more reactive power by equipping with larger-sized converters. However, this approach has the disadvantage that it results in exceptionally high costs. Furthermore, it has the disadvantage that, depending on the requirements of the network operator, otherwise identical wind turbines would have to be provided with different converters, thus increasing component complexity. Finally, simply equipping with a larger converter is disadvantageous for retrofitting, as this is exceptionally complex and is in many cases not economically feasible. Therefore, there is a need to refine a converter of the kind initially specified in such a way that it is possible to provide a higher continuous load, in particular for the increased provision of reactive power, despite active components of the converter being unmodified.

SUMMARY OF THE INVENTION

An object of the present invention is to provide such a converter and to provide a method for its operation.

This can be achieved by the features as broadly disclosed herein. Advantageous refinements are disclosed in the detailed embodiments described below.

In a converter including a converter control for a wind turbine which has a generator which is connected to the converter and a chopper, wherein the converter control includes a dynamic limit value which is allowable for a first tolerance time and a static limit value of the converter, according to the present invention, an overcurrent module is provided which includes a limit value expander which is designed to increase the static limit value by a portion of the difference from the dynamic limit value as additional current, and a dynamic module which interacts with the limit value expander in such a way that overcurrents between the static limit value which is increased by the additional current and the dynamic limit value are routed in a first stage to the converter and in a second stage at least partially to the chopper, wherein a switch is made to the second stage after a second tolerance time which is preferably less than the first tolerance time.

Certain terms will first be explained below:

A static limit value is to be understood to be the nominal current value which the converter is suitable to provide over a period of time which is per se unlimited, i.e., continuous. This limit value is generally identical to the (continuous) nominal current of the converter.

The dynamic limit value is to be understood to be that current which the converter is cable of accommodating by utilizing its (in particular thermal) reserves for a limited period of time. This limit value, which is also referred to as transient peak current, may be considerably higher than the static limit value. In practically designed converters, the dynamic limit value may be almost twice as high as the static limit value, but is often limited to a tolerance time of only a few seconds (for example, six seconds). The period of time over which the dynamic limit value may be present without resulting in an overload is referred to as the tolerance time.

Additional current is to be understood to be a current between the static limit value and the increased limit value according to the present invention; currents in excess of this are referred to as overcurrents.

The present invention is based on the idea of setting an increased value for the static limit value ("increased limit value") in comparison to the normal configuration of a converter and thus correspondingly reducing the remaining reserve for dynamic oscillations to the dynamic limit value. This current value, by which the static limit value is increased and the current reserve is correspondingly reduced to the dynamic limit value, is referred to as additional current. This additional current increases the total current which may be provided by the converter. This relates to an apparent current, so that an increase of the apparent current enables a disproportionate increase in the reactive current due to the vector relationships between active current and reactive current. The same converter is thus capable of providing disproportionately more reactive current and thus reactive power.

The present invention has recognized that since a pure limit value increase is not sufficient, another significant addition is required, and the present invention provides this addition. If the converter were to be simply reset to an increased static limit value, this would have the inevitable negative consequence of a lower resistance of the converter to peak current loads, which may arise in particular during transient excess rotational speeds of the wind turbines (so-called gust resistance) or during network frequency drops. This is because the remaining current reserve is then not only reduced to the dynamic limit value, but the active components of the converter are also already thermally more heavily loaded due to the additional current, so that if the current increases to the dynamic limit value, the thermal load limit would be reached more rapidly. If it were left at that, the practical applicability of the converter to actual operating conditions having fluctuating wind strength and possible network malfunctions would no longer be sufficient.

The present invention starts at this point by providing an overcurrent module which, in the case of the occurrence of overcurrents, i.e., currents above the static limit value which is increased by the additional current up to the dynamic limit value, not only applies the increased current to the converter, but also includes the chopper which is associated with it. The overcurrent module has two switching stages, a first switching stage in which the overcurrent is routed only to the converter and its active components (switching elements), and a second stage in which the overcurrent is (alternatively or additionally) routed into the chopper. The switching from the first stage to the second stage is carried out after a certain time, the second tolerance time. For example, if the maximum value of the dynamic current limit value occurs during operation due to excess rotational speeds, this high current is routed into the converter only for the (relatively short) second tolerance time, and after the second tolerance time has elapsed, the current is routed into the chopper in order to reduce the thermal load of the converter. Rerouting into the chopper allows the thermal load of the converter and its active components to be reduced in a controlled manner. The operational safety is thus ensured up to the dynamic limit value, even in the case of overcurrents.

The present invention thus makes it possible to operate the converter having an increased static limit value in order to provide more reactive power for supporting the network. In particular, the capacity of the converter and wind turbines thereby equipped is thus increased for the network products Q and cos ϕ, which are becoming increasingly important, this being achieved without modifying components and thus practically without additional costs (due to minimally reinforced cables and network chokes if required). In particular, as a result of the present invention, it is not necessary to modify the comparatively exceptionally expensive active components of the converter.

For switching between the stages, a dynamic module is preferably advantageously designed in such a way that it determines the second tolerance time as a function of current, preferably via a current-time integral. It has been shown that the tolerance time varies depending on the level of the dynamically occurring overcurrent. If the overcurrent is low, the second tolerance time may be greater than in the case of higher overcurrent. A current-time integral has proven to be particularly useful here. The current is advantageously entered quadratically here, so that an amount of energy is formed which reflects the thermal load, in particular of the active components of the converter.

The overcurrent module is preferably refined in such a way that it has a third stage in which the first and second stages of the overcurrent module are actuated. The overcurrent thus flows both into the converter while fully utilizing the dynamic limit value, and into the chopper, in order to accommodate even more current beyond the dynamic limit value ("ultracurrent"). Using this ultracurrent, the current which is able to be accommodated dynamically may be increased to such an extent that the gap from the increased static limit value again corresponds to the original gap between the dynamic limit value and the (not increased) static limit value. The converter thus simultaneously has an increased tolerance with respect to the dynamic current load. Thus, even the dynamic limit value may be increased without requiring hardware-based changes to the converter.

An enable input is advantageously provided via which the limit value expander may be enabled or disabled. If there is no signal at the enable input, the limit value expander is disabled and the converter receives no increased static limit value. It is able to provide no additional current. This enable input makes it possible to exclude a wind turbine from the provision of additional current, which may be significant for the operational safety of the facilities, in particular under critical operating conditions, in particular in the case of gusty winds. For this purpose, a wind gust module is preferably provided which has an output which is applied at the enable input. The wind gust module is designed to determine a wind gust index based on the parameters provided by the wind turbine (these may be power data for the generation of the electric power or wind data), and to provide an output signal if an adjustable limit value is exceeded. Thus, in the case of wind gusts, it is possible to block the change in the static limit value and therefore the provision of additional current, so that the wind turbine is optimally capable of compensating for the wind gusts. The wind gust module advantageously has multiple outputs which are designed for controlling additional wind turbines.

The wind gust module is preferably situated at a wind farm master which controls a wind farm having multiple wind turbines. The wind gust module situated at the wind farm master may thus be designed in such a way that the provision of additional reactive power requested by the network operator is achieved by enabling additional current for those wind turbines of the wind farm which are not affected by wind gusts. In this respect, use is made of the realization that due to the spatial expanse of a wind farm, only a portion of the wind turbines is ever affected by wind gusts.

The present invention also extends to a wind farm including a wind farm master and multiple wind turbines which are provided with a converter as described above. For a more detailed explanation, reference is made to the above description.

The present invention extends further to a method for operating a converter for a wind turbine including a generator connected to the converter and a chopper and a converter control for the converter, wherein the converter control includes a dynamic limit value which is allowable for a first tolerance time and a static limit value of the converter, wherein according to the present invention, it is provided to provide an additional current by increasing the static limit value of the converter by a portion of the difference from the dynamic limit value, wherein overcurrents between the static limit value which is increased by the additional current and the dynamic limit value are routed in a first stage on the converter and in a second stage at least partially to the chopper, wherein a switch is made to the second stage after a second tolerance time which is less than the first tolerance time.

BRIEF DESCRIPTION OF THE DRAWINGS

The present invention is described in greater detail below with reference to the appended drawings, in which one advantageous exemplary embodiment is depicted.

FIG. 1 shows a schematic view of a wind turbine according to one exemplary embodiment of the present invention;

FIGS. 2a and 2b show characteristic power curves of the wind turbine according to FIG. 1 overall and with respect to the converter;

DETAILED DESCRIPTION OF THE INVENTION

Figure 3:
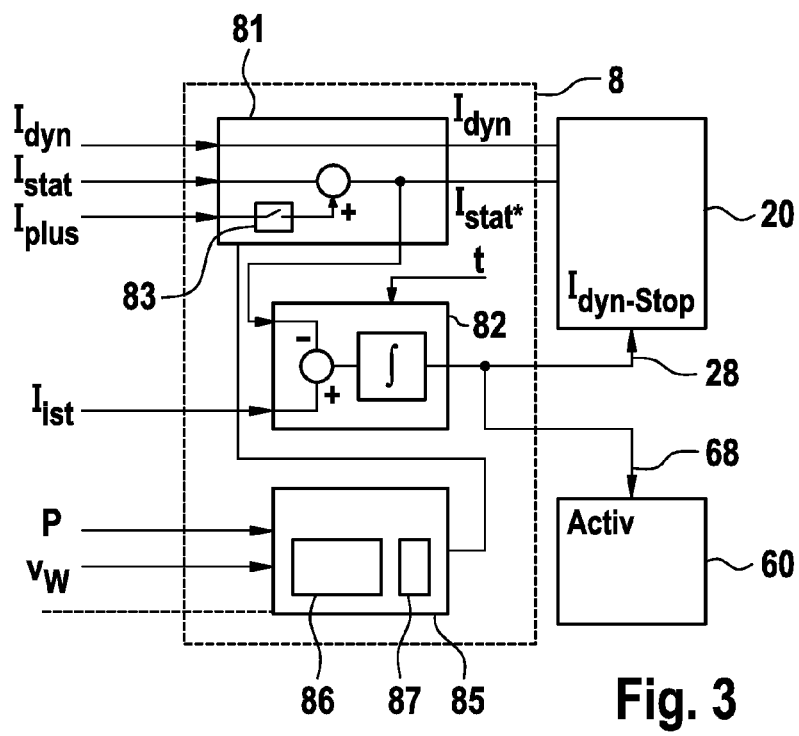
FIG. 3 shows a block diagram of an overcurrent module at a converter of the wind turbine.

A wind turbine according to one exemplary embodiment of the present invention includes a generator 1 which is driven by a wind rotor 10 and having a converter 2 for generating electric energy. The energy is fed into a medium-voltage network 5 via a cable 3 and a medium-voltage transformer 4 situated at the wind turbine. The medium-voltage network may in particular be an internal farm network of a wind farm which has a wind farm master 50 for controlling the wind turbines on the wind farm. Furthermore, a converter control 20 and a chopper 6 having a chopper control 60 are provided for the converter 2. An operational control 7 is provided for the high-level control of the wind turbine.

The generator 1 is designed in the depicted exemplary embodiment as a double-fed asynchronous generator. It includes a stator 11 and a rotating rotor 12. The stator 11 is connected directly to the cable 3. The rotor 12 is connected to the cable 3 via the converter 2. The converter 2 includes machine-side inverter 21, a network-side inverter 23, and a DC voltage intermediate circuit 22 situated between them connecting the two inverters 21, 23. The two inverters include a plurality of active switching elements which are represented by the reference numeral 24.

The converter control 20 controls the converter 2 in such a way that the electric power generated by the rotor 12, which is a three-phase AC voltage having a frequency which is a function of the rotational speed of the wind rotor, is converted by the machine-side inverter 21 into DC voltage and routed to the intermediate circuit 22. The network-side inverter 23 is supplied by the intermediate circuit 22 and converts the extracted electric power into three-phase AC voltage having a fixed frequency which is the same as the network frequency of the connected network 5. This operating mode, in which the converter 2 delivers electric power to the network 5, is referred to as super-synchronous operation. Furthermore, there is an operating mode in sub-synchronous operation. It is used in the case of a rotor rotational speed which is lower than the synchronous rotational speed $n_{sync}$ corresponding to the network frequency, i.e., in the case of low wind strength. In this case, the direction of the power flow through the converter 2 is reversed. The network-side inverter 23 feeds the intermediate circuit 22, which in turn supplies the machine-side inverter 21 for feeding excitation current into the rotor 12.

The power flows resulting as a function of the rotational speed are depicted in FIG. 2a. The rotational speed range (on the left in the figure) below the synchronous rotational speed $n_{sync}$ shows the sub-synchronous operation, and the rotational speed range above shows the super-synchronous operation. The allowable range for the stationary operation extends to the nominal rotational speed $n_{nominal}$. Above that, a dynamic overload range follows, up to the maximum rotational speed $n_{max}$, which may be used only transiently in the case of wind gusts. The greatest portion of the electric power is fed in by the stator 11 ($P_{stat}$, see dotted line in FIG. 2a). A smaller portion of the power, which is negative in sub-synchronous operation (i.e., reverse power flow), is provided by the rotor 12 or consumed in sub-synchronous operation ($P_{rot}$, see dashed line). The total power $P_{tot}$ delivered by the wind turbine is represented by the solid line.

The currents flowing in the converter 2 are depicted in FIG. 2b. The static limit value $I_{stat}$ and dynamic limit value $I_{dyn}$ are depicted as horizontal dash-dotted lines. The negative current flow in the low rotational speed range, i.e., in sub-synchronous operation, may be clearly identified. In super-synchronous operation, the current flow increases linearly until it reaches the static current limit value $I_{stat}$ approximately at the nominal rotational speed $n_{nominal}$, which may be exceeded in wind gust operation until the dynamic current limit value $I_{dyn}$ (shaded area) is reached. If $I_{dyn}$ is on the verge of being exceeded, or the current remains too long in the range which is only dynamically allowable (shaded), current is reduced to the static limit value $I_{stat}$ (allowable for an unlimited time) in order to protect the components. This reduction is carried out with the aid of the chopper 6, as described below.

The chopper 6 is connected to the intermediate circuit. It includes a resistor 61 for dissipating excess energy and a switching element 62 which connects and disconnects the resistor 61. The converter control 20 interacts with the chopper control 60 for monitoring the DC voltage in the intermediate circuit. If the voltage becomes too high, the chopper control actuates the switching element 62. Current thus flows through the resistor 61, thereby effectively reducing the voltage in the intermediate circuit 22.

In order to enable a higher static current using a converter 2 which is unmodified per se, an overcurrent module 8 is used according to the present invention, as depicted in FIG. 3. Its design and functionality are described below. Limit values for the static limit value $I_{stat}$ and the dynamic limit value for the current are applied to the converter control 20. According to the present invention, a limit value expander 81 is connected intermediately, at which an additional input is provided for a desired additional current $I_{plus}$. The limit value expander 81 increases the static limit value $I_{stat}$ by the desired additional current and thus forms the modified static limit value $I_{stat}^*$, which is applied as a limit value to the converter control 20 which is known per se. In this exemplary embodiment, the dynamic limit value $I_{dyn}$ remains unchanged. The modified static limit value $I_{stat}^*$ is depicted in FIG. 2b by the dashed line for comparison.

In addition to the limit value expander 81, the overcurrent module 8 furthermore includes a dynamic module 82 which is connected to the converter control 20 and to the chopper control 60. It has inputs for the current $I_{actual}$ actually flowing in the converter, the modified static limit value $I_{stat}^*$, and time t. The dynamic module 82 uses differentiation to determine whether the actual current is above the modified limit value $I_{stat}^*$, i.e., whether overcurrent is flowing. If yes, the amount of the overcurrent is integrated over time in order to generate a measure of the thermal load of the switching elements of the converter 20. If it reaches a certain value, a switching signal is output to switch the stages. During normal operation, the overcurrent module is switched to its first stage, allowing the operation of the converter 2 using the dynamic limit value. If a switching signal is applied from the dynamic module 82, a switch is made to the second stage, in which the operation of the converter 2 using the dynamic limit value is blocked via a blocking signal input 28 in the converter control 20 and instead the chopper 6 is actuated via an activation signal input 68 of the chopper control 60. The overcurrents are thus rerouted into the chopper 6, so that the switching elements 24 of the converter 2 are protected and are thus able to recover thermally.

Figure 4:
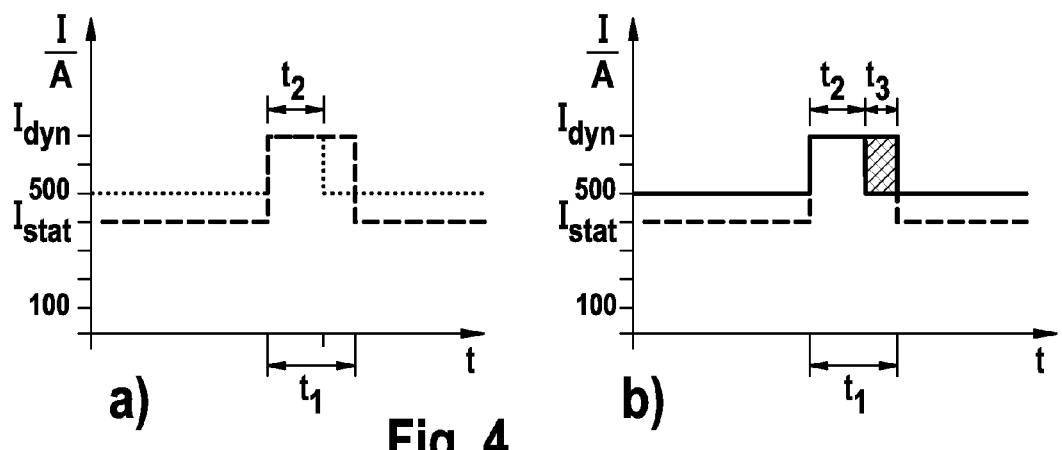
FIGS. 4a and 4b show current-time diagrams for a conventional wind turbine and the wind turbine according to the exemplary embodiment of the present invention.

In FIG. 4a, the limit values for $I_{stat}$, $I_{dyn}$ for a conventional wind turbine are shown using a dashed line. The corresponding limit values in the case of a simple increase of the static limit value $I_{stat}'$ are shown for comparison using a dotted line. It is apparent that the possible static current could be increased by simply providing an oversized static limit value $I_{stat}'$. However, the first tolerance time $t_1$ for the dynamic limit value would then be significantly reduced (to $t_2$). Taken by itself, this is unacceptable, since sufficient overload safety, in particular wind gust resistance, is thus no longer provided. As depicted in FIG. 4b, according to the present invention, the initial period of time $t_1$ is re-established for the dynamic limit value, in which, after a second tolerance time $t_2$ elapses which is less than the first tolerance time $t_1$, the chopper is activated in a second stage (cross-hatched region, period $t_3$), which assumes the overcurrent dynamically. The semiconductors 24 in the converter 2 are thus relieved to the extent that only a current which is at maximum equal to the static limit value still flows through them. The semiconductors 24 are thus protected from overload, and full overload safety (in particular, wind gust resistance) is thus ensured. The present invention requires practically no additional hardware expenditure for this, since the chopper 6 is present in any case. The allowable static current of the converter 2 may thus be increased without additional costs, and overload protection (in particular, wind gust resistance) is maintained.

Figure 5:
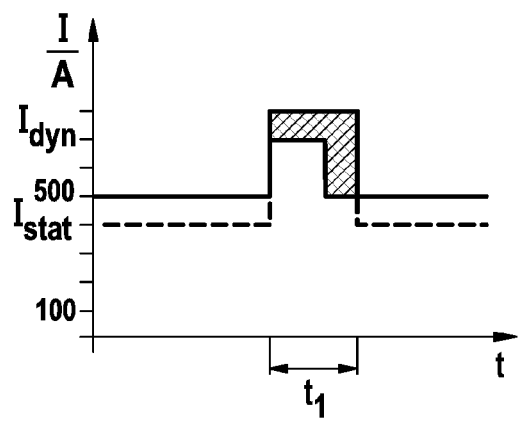
FIG. 5 shows a current-time diagram according to one variant of the exemplary embodiment.

The overcurrent module 8 may also optionally be designed in such a way that it actuates the chopper 6 already in the first stage, in addition to the overcurrent in the converter 2, i.e., still during the second tolerance time $t_2$ (see left portion of the cross-hatched region in FIG. 5). In this operating mode, which is also referred to as the "third stage", the dynamic limit value may also be temporarily increased. In converter 2 unmodified by the hardware, is it possible to increase not only the static limit value by the additional current, but also the dynamic limit value, so that the initial gap between the static and dynamic limit values is re-established.

The overcurrent module 8 optionally further includes a wind gust module 85. It has inputs for the wind speed $v_w$ and possibly also for the power P delivered by the wind turbine. A blocking signal is output at its output which is applied to the limit value expander 81, where it blocks the increase of the static limit value by the additional current via a blocking element 83. The wind gust module 85 includes a load calculator 86 which determines a wind gust index from data from the electrical real power P generated by the wind turbine and the data about the respective wind speed. If a comparator 87 detects that this index is above a critical value, the blocking signal is output at the output. Thus, in the case of wind gusts, it is possible to block the change in the static limit value and therefore the provision of additional current, so that the wind turbine is optimally capable of compensating for the wind gusts. The wind gust module may alternatively also be situated at the wind farm master 50 (see function block 85'). It has multiple outputs which are used to control additional wind turbines 9.

The gain made possible by the provision of additional current, in particular of reactive power Q which may additionally be fed in, is considerable due to the vector relationship between active current and reactive current. As a result of the present invention, reactive power is able to be additionally fed in for operation at full load, i.e., if the delivered real power is equal to the nominal power. An example illustrates this: at a nominal power at the level of the maximum real power of P=2000 kW, it is possible to feed in reactive power in the amount of Q=640 kVAr; i.e., a very sizable result with a very low additional expenditure.

The invention claimed is:

1. A converter system for providing power to a network from a wind turbine having a generator connected to a converter, the converter system comprising:
    a converter control that includes a dynamic current limit value that is associated with a limit of current provided by the converter that is allowable for a first tolerance time and a static current limit value that is associated with a limit of current provided by the converter that is allowable for unlimited time;
    a chopper; and
    an overcurrent module that includes
        a limit value expander configured to increase the static current limit value by a portion of the difference from the dynamic current limit value, and
        a dynamic module configured to interact with the limit value expander such that overcurrents between an increased static current limit value and the dynamic current limit value are routed in a first stage to the converter and in a second stage at least partially to the chopper while the converter continues to provide current, wherein the overcurrent module is configured to switch from the first stage to the second stage after a second tolerance time.

2. The converter system of claim 1, wherein the second tolerance time is less than the first tolerance time.

3. The converter system of claim 1, wherein the dynamic module determines the second tolerance time as a function of current.

4. The converter system of claim 1, wherein the overcurrent module has a third stage in which the first and second stages are activated simultaneously.

5. The converter system of claim 1, wherein the limit value expander has a blocking element connected to a blocking input and configured to block the increase of the static current limit value.

6. The converter system of claim 1, comprising a wind gust module having inputs for power of one or both of the wind turbine and wind speed and configured to output a blocking signal if a limit value is exceeded.

7. The converter system of claim 6, wherein the output of the wind gust module is connected to the input of a blocking element of the limit expander, the blocking element connected to a blocking input and configured to block the increase of the static limit value.

8. The converter system of claim 6, wherein the wind gust module has multiple outputs for controlling multiple wind turbines.

9. A wind farm comprising a wind farm master and a plurality of wind turbines, each wind turbine having a generator, a converter including a converter control, a chopper, and an overcurrent module, wherein the converter control includes a dynamic current limit value that is associated with a limit of current provided by the converter that is allowable for a first tolerance time and a static current limit value that is associated with a limit of current provided by the converter that is allowable for unlimited time, wherein the overcurrent module includes a limit value expander configured to increase the static current limit value by a portion of the difference from the dynamic limit value, and a dynamic module configured to interact with the limit value expander such that overcurrents between an increased static current limit value and the dynamic current limit value are routed in a first stage to the converter and in a second stage at least partially to the chopper while the converter continues to provide current, wherein the overcurrent module is configured to switch from the first stage to the second stage after a second tolerance time.

10. The wind farm of claim 9, wherein the overcurrent module is situated at each of the wind turbines.

11. The wind farm of claim 9, wherein the overcurrent module is situated at the wind farm master.

12. The wind farm of claim 9, comprising a wind gust module having inputs for power of one or both of the wind turbine and wind speed and configured to output a blocking signal if a limit value is exceeded.

13. The wind farm of claim 12, wherein the wind gust module has a plurality of outputs for the individual wind turbines of the wind farm.

14. The wind farm of claim 9, wherein the second tolerance time is less than the first tolerance time.

15. A method for operating a converter for a wind turbine including a generator connected to the converter, a chopper and a converter control for the converter, wherein the converter control includes a dynamic current limit value that is associated with a limit of current provided by the converter that is allowable for a first tolerance time and a static current limit value that is associated with a limit of current provided by the converter that is allowable for unlimited time, the method comprising providing an additional current with the aid of an overcurrent module by increasing the static current limit value of the converter by a portion of the difference from the dynamic current limit value, wherein overcurrents between an increased static current limit value and the dynamic current limit value are routed in a first stage to the converter and in a second stage at least partially to the chopper while the converter continues to provide current, wherein the first stage is switched to the second stage after a second tolerance time.

16. The method of claim 15, wherein the second tolerance time is less than the first tolerance time.

17. The method of claim 15, wherein the converter is used in wind turbines of a wind farm.

18. The converter system of claim 3, wherein the dynamic module determines the second tolerance time as a function of current via a current-time integral.

19. The converter system of claim 8, wherein the wind gust module is situated at a wind farm master of a wind farm.

20. The wind farm of claim 12, wherein the wind gust module is situated at the wind farm master.

21. The method of claim 17, wherein load monitoring is provided at a wind farm master with the aid of a wind gust module.

* * * * *